June 29, 1948.
D. K. WARNER
2,444,318
JET PROPULSION SYSTEM FOR AIRCRAFT
Filed April 24, 1944
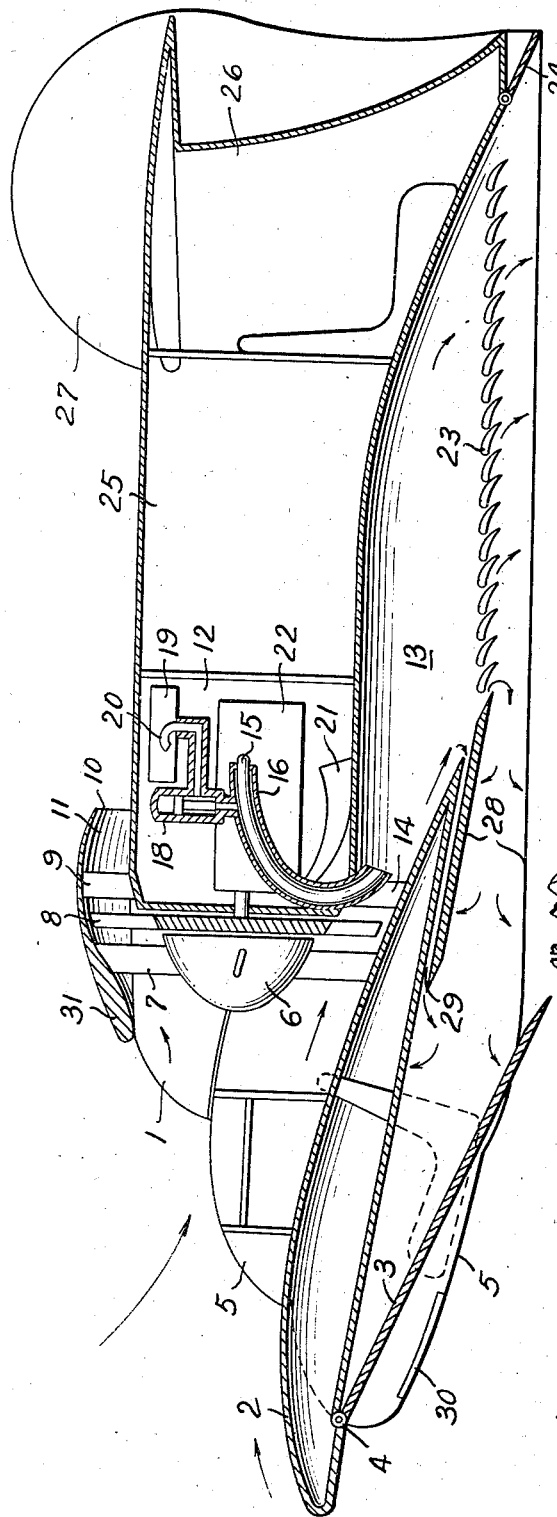
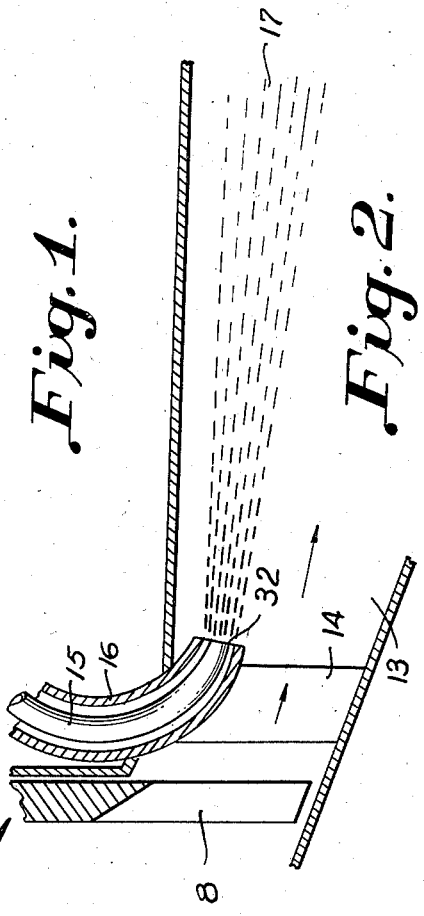
Inventor:-
Douglas K. Warner Patented June 29, 1948

2,444,318

UNITED STATES PATENT OFFICE 2,444,318

JET PROPULSION SYSTEM FOR AIRCRAFT

Douglas K. Warner, Sarasota, Fla.

Application April 24, 1944, Serial No. 532,546

8 Claims. (Cl. 244—23)

This invention relates to jet propulsion of aircraft and more particularly to the heating, and controlling the directional flow, and expansion, of air compressed for the purposes of propelling aircraft.

The primary objects of my invention are: first, to add heat to all or part of the air compressed for propulsion purposes in a manner to utilize that heat to maximum advantage, second to provide that heat at minimum cost of steady operation, third to provide means for adding extreme quantities of heat at necessarily lower efficiencies for short intervals in order to multiply the normal power of the craft during such short intervals, said heat being provided by burning fuel in a large compression space, fourth releasing heated propulsion air thru diffusion nozzles in a downward rearward direction beneath the plane, fifth to utilize the pressure of the air so released beneath the plane to blow the plane away from a surface and permit it to skim a land runway and then a water surface while attaining the necessary velocity to permit efficient higher flight by means of jet propulsion, and by so enormously extending the takeoff run to thereby permit flight with enormously heavier loads.

With these and other objects in view, my invention consists in the novel features herewith fully shown and described; and it further consists in an equally new form of aircraft body in order to better utilize this new form of propulsion.

In the accompanying drawing like numerals indicate like parts in Fig. 1 and its exhaust section enlargement Fig. 2.

Figure 1 is a sectional view of a side of my vehicle at its center line.

Fig. 2 is a sectional view of the end of the engine's exhaust pipe and the main diffusion nozzle.

Referring to Fig. 1 it will be seen that this plane is similar to that in my application for patent 512,209 with the exception that front rudders 1 are added at each upper side of the path to the pressure fan, these being free to swing from a rear joint inwardly are for the primary purpose of increasing the diffusion of air as greater velocities are reached and the rudders are toed in to reduce the velocity of the air approaching the pressure fan, though they may also be used to guide the plane or to compensate for loss of propulsion on one side of the plane. These rudders may be vertical or inwardly inclined upwardly to more closely approach the form of the top portion of the fan opening.

The general form of the body is as in the application 512,209. Two forward cockpits 5, one each side of the central air foil 2 of much deeper thicker air foil shape to give a lift and minimum air resistance to these cockpits while at the same time affording sides to an air passage or space beneath the said central connecting airfoil 2. A flap 3 hinged beneath a notch 4 in the lower surface of airfoil 2 is free to move rapidly up and down over the surface of waves as they pass thru said central passage between the sides of the cockpits 5.

An air deflector 6, mounted on stationary airfoils or air straighteners 7, guides the inlet air to the fan blades 8, which blades are of much greater length at their leading edge than at their trailing edge so that the velocity energy may be imparted to the air at its maximum density, rather than before it reaches the blade, as must be the case where the blade is all the same length. The top sector of air passes the stationary blades 9, which straighten the fans whirling slip stream, deflecting it straight back with increased propulsion efficiency, and this air is then speeded up more in the contracted throat 10, of the semicircumferential passage 11, formed above the engine room 12. The pressure imparted to the air by the diffusion ahead of the fan, and by the fan action is thereby converted to maximum velocity in a minimum of passage way inside the plane, and so with a minimum of air friction loss.

The air delivered from the lower sector of the fan blades 8 enters a large diffusion nozzle 13 beneath the engine room 12, passing straightener blades 14 in one or more of which may be incorporated an outlet passage for the exhaust of the engine 15, and its surrounding passage 16. The engine exhaust pipe 15, shown enlarged in Fig. 2, is contracted at its outlet 32 to convert a relatively high pressure contained therein into velocity energy, and the outlet of the surrounding passage is likewise restricted to convert a much higher pressure of fuel vapor into velocity energy sufficient to penetrate all portions of a large pressure chamber 17. Both exhaust pipe 15, and its surrounding pipe 16, are normally heated to a red heat by exhaust being carried within the inner pipe at some 12 pounds back pressure. When additional power is required, fuel is admitted to the space between the two pipes thru the piston controlled valve 18, from the fuel tank 19, supplied with weighted flexible nozzle inlet pipe 20, which is so weighted and flexible in order that its inlet end may be kept under the fuel surface no matter what position the plane may be in.

A diffuser nozzle 21 compresses 3%, approximately, of the air delivered from the fan for use in burning fuel in the fan's engine 22. Preferably somewhat more than half the fan's air is discharged above the aircraft and the balance remaining is discharged into the compression space 17, below the aircraft, where its energy is augmented by all the waste heat of the engine, plus the velocity energy of the exhaust, which is retained at any desired pressure by means of the contraction at the end of the exhaust pipe.

With the above proportionate disposition of the air compressed by the fan which would be found when this fan developed 5# pressure before the plane starts to move and which would remain the same proportion when the fan is handling larger volumes of air with increased engine power when a 500 M. P. H. air or plane speed giving an initial 5# ram pressure boosts the fan pressure to 12# gage. We now find that we have compressed to 12 lbs. pressure in a large space beneath the plane, 15 times as much air as had been burned in the engine, and if we then burn 14 times as much fuel in this compressed air as is burned in the engine we can expect to get from 5 to 6 times our normal propulsive power at a correspondingly lower efficiency due to the much lower initial pressure. Of course the high temperature resulting would not permit this emergency fuel to be burned for more than 12 seconds, but in that time the plane could have moved 2 miles from the danger point or could have gotten safely away from the waves in a rough sea take-off.

In some cases where it is not desired to drop bombs from the storage 25 above the compression space 17 this compression space may be floored with airfoils 23 which act as rediffusion nozzles and direct the air more evenly and more exactly than when the compression space is left entirely open. In this manner a thin even layer of compressed air is continually spread out below the plane, this air at first traveling out below and backwardly at an angle of about 45 degrees. While the plane is skimming over land or water, the air (after leaving these diffuser nozzle airfoils 23) will move forward under the plane and push flap 3 forward and down against the surface below. When a wave or other obstacle is encountered this flap rises and lets the wave pass thru the lower part of the compression chamber and another flap 24 rises and lets it pass out at the stern without disturbing the stability of the plane or jolting the passengers.

Compartment 26 is shown to afford room for a tail gunner to be comfortably seated while having a broad range between the two tail fins 27 which form the tips of the main wing, which wing must be at the tail in a plane which originally takes off on air compressed below the plane.

A plate 28 is spaced below the rear of central airfoil 2 in order that compressed air may be carried forward in passage 29 (formed between this plate and said airfoil) at times when such passage would be otherwise blocked by a passing wave. This permits instant reformation of a pressure condition under the forward part of the plane before the wave has passed the trailing edge of the central airfoil 2 and it also permits a partial pressure condition under the forward part of the plane while it is in flight, by ejecting air downwardly at the tip of flap 3 where it connects with the forward end of plate 28, as it does when up in flight position. A window 30 below cockpits permits visibility when landing at 42° attack angle and cowl 31 curves above inlet to fan 8.

Having thus described my invention what I claim as new and desire to secure by Letters Patent is:

1. In an aircraft, a body having a diffuser passage adapted to receive a power jet, an engine in said body, a fan driven by said engine and arranged to discharge into said diffuser passage, a conduit leading from said engine and directing the exhaust gases from said engine into said diffuser passage, a jacket surrounding said conduit, said conduit and jacket having adjacent outlet openings whereby fuel may be injected into said jacket where it is vaporized and superheated and whereby the vapor thereof may be ejected into the flow of air from said fan at higher than fan air velocity and be ignited with said air by the flames from said exhaust conduit, an emergency fuel tank containing fuel under pressure and in communication with said jacket surrounding said conduit, and a flexible inlet pipe in said tank connecting with said jacket and capable of being actuated by gravity whereby the entrance of said flexible pipe is caused to remain below the surface of the liquid fuel in said tank regardless of the position of said airplane.

2. In an aircraft, a body having a diffuser passage arranged to discharge beneath said aircraft, an engine in said body and a fan driven by said engine and arranged to discharge air, means arranged to convey a portion of the discharge air from the fan into said diffuser passage and to convey the remainder of the air discharged from the fan at its upper portion at high velocity rearwardly above said body, a conduit leading from said engine and extending into said diffuser passage for directing exhaust gases from said engine into said diffuser passage in the same direction as that of the fan discharge.

3. In an aircraft, a body having a diffuser passage, an engine, a fan driven by said engine and arranged to discharge into said passage and thence beneath said aircraft, a conduit leading from said engine and extending into said diffuser passage for directing engine exhaust gases into said passage, a jacket surrounding said conduit terminating at the end of said conduit in a contracted opening surrounding the end of said conduit, a fuel tank maintained under pressure and a pipe and valve connecting said tank with said jacket whereby fuel may be admitted to said jacket for a few seconds during takeoff or combat and whereby said fuel under pressure will be vaporized and preheated by said exhaust conduit and whereby said fuel will be ignited with the fan compressed air in said diffuser by the flames issuing from said conduit.

4. An aircraft comprising a body, an engine in said body, a fan mounted forwardly of said body and in driven engagement with said engine, said fan having blades extending above and below the front end of said body, said fan being arranged to discharge air rearwardly, a cowling mounted above said fan, the rear portion of said cowling being arranged to form, in conjunction with the top surface of said body, a first discharge passage extending rearwardly from said fan above said body, means arranged to form, in conjunction with the bottom surface of said body, a second discharge passage extending rearwardly and downwardly from said fan below said body, said first discharge passage decreasing rearwardly in cross-sectional area, said second passage increasing rearwardly in cross-sectional area, and means arranged to form, in conjunction with the front portion of said cowling, an air supply passage extending forwardly from said fan blades for supplying air thereto and having an air intake opening at its front end, said air supply passage increasing rearwardly in cross-sectional area, whereby the air pressure is increased and the air velocity reduced in the air supply passage, the air pressure and velocity are increased at the fan blades, the air velocity is increased in said first discharge passage, and the air pressure is increased in said second discharge passage.

5. The structure of claim 4, a conduit leading from said engine to said second discharge passage and discharging engine exhaust rearwardly in the direction of air flow from said fan in said passage.

6. The structure of claim 4 and vertical rudders extended forwardly of said fan at each side of and ahead of said fan cowling and means for moving inwardly the forward extremities of said rudders when the aircraft is moving at high speed, whereby air entering beneath said cowling and between said rudders may be diffused to higher pressure and lower velocity at said fan.

7. The structure of claim 4, a conduit from said engine to said second passage carrying exhaust gases from said engine to said passage, a second conduit enclosing said first conduit and a reserve fuel storage communicating therewith and a valve therebetween, means for opening said valve in emergency or at takeoff whereby fuel may be made to contact said first conduit and be not only vaporized but also superheated thereby and means for releasing the fuel vapor over the end of said first conduit whereby it may be ignited by exhaust flame and burned with fan compressed air in said second passage.

8. The structure of claim 3, and vanes in said diffuser passage arranged to straighten out the twirling air flow behind said fan, the terminal portions of said conduit and said jacket being disposed in one of said vanes and discharging at the trailing edge thereof.

DOUGLAS K. WARNER.

REFERENCES CITED

The following references are of record in the file of this patent:

UNITED STATES PATENTS

| Number | Name | Date |
|---|---|---|
| 1,003,364 | Langston | Sept. 12, 1911 |
| 1,307,135 | Lake | June 17, 1919 |
| 1,375,601 | Morize | Apr. 19, 1921 |
| 1,382,535 | Offen | June 21, 1921 |
| 1,389,797 | Thompson | Sept. 6, 1921 |
| 1,605,484 | Thompson et al. | Nov. 2, 1926 |
| 1,871,055 | Hasbrouk | Aug. 9, 1932 |
| 1,986,064 | Leray | Jan. 1, 1935 |
| 2,024,274 | Campini | Dec. 17, 1935 |
| 2,072,029 | Crowe | Feb. 23, 1937 |
| 2,348,106 | Brian | May 2, 1944 |

FOREIGN PATENTS

| Number | Country | Date |
|---|---|---|
| 818,703 | France | Jan. 21, 1937 |
| 449,148 | Great Britain | Mar. 15, 1935 |

OTHER REFERENCES

Ser. No. 367,666, Anxionnaz et al. (A. P. C.), published May 25, 1943.